US006991285B1

(12) United States Patent
Hemenway

(10) Patent No.: US 6,991,285 B1
(45) Date of Patent: Jan. 31, 2006

(54) REVERSIBLE SEATBACK FOR A VEHICLE

(76) Inventor: Michael S. Hemenway, 307 Almond Ct., Vernon Hills, IL (US) 60061

( * ) Notice: Subject to any disclaimer, the term of this patent is extended or adjusted under 35 U.S.C. 154(b) by 0 days.

(21) Appl. No.: 10/802,556

(22) Filed: Mar. 17, 2004

(51) Int. Cl.
*B60N 2/02* (2006.01)
*B60N 2/32* (2006.01)
*A47C 7/02* (2006.01)

(52) U.S. Cl. ............. 297/94; 297/95; 297/440.16; 296/65.01

(58) Field of Classification Search ............. 297/94, 297/95, 237, 238, 256.16, 114, 440.16; 296/65.01, 296/64
See application file for complete search history.

(56) References Cited

U.S. PATENT DOCUMENTS

| 870,385 | A |   | 11/1907 | Rideout et al. |
|---|---|---|---|---|
| 901,321 | A | * | 10/1908 | Bullock, Jr. ............. 297/94 |
| 1,051,040 | A |   | 1/1913 | Wheatley |
| 2,004,850 | A |   | 6/1935 | Bugatti |
| 2,009,016 | A | * | 7/1935 | Robinson, Sr. ......... 297/94 X |
| 2,059,397 | A | * | 11/1936 | Robinson, Sr. ......... 297/95 X |
| 3,964,713 | A |   | 6/1976 | Joslyn et al. |
| 3,964,785 | A |   | 6/1976 | Plume |
| 4,045,080 | A |   | 8/1977 | Barecki et al. |
| 4,061,396 | A |   | 12/1977 | Reida |
| 4,072,343 | A |   | 2/1978 | Meza |
| 4,081,051 | A |   | 3/1978 | Logsdon ............... 297/94 X |
| 4,277,043 | A |   | 7/1981 | Weik |
| 4,415,201 | A |   | 11/1983 | Wang |
| 4,436,270 | A |   | 3/1984 | Muraishi |
| 4,555,135 | A |   | 11/1985 | Freeland |
| 4,588,229 | A |   | 5/1986 | Jay |
| 4,742,984 | A |   | 5/1988 | Cote et al. |
| 4,756,573 | A |   | 7/1988 | Simin et al. |
| 4,759,580 | A |   | 7/1988 | Berklich, Jr. et al. |
| 5,000,505 | A |   | 3/1991 | Kawashita et al. |
| 5,121,964 | A |   | 6/1992 | Fourrey et al. |
| 5,280,987 | A |   | 1/1994 | Miller |
| 5,312,156 | A |   | 5/1994 | Heussner et al. ....... 297/114 X |
| 5,322,341 | A |   | 6/1994 | Harrison et al. ............. 297/94 |
| 5,330,245 | A |   | 7/1994 | Boisset |
| 5,335,963 | A |   | 8/1994 | Muller et al. |
| 5,390,976 | A |   | 2/1995 | Doughty et al. |
| 5,409,293 | A |   | 4/1995 | Nagasaka |
| 5,524,962 | A |   | 6/1996 | Fulgenzi et al. |
| 5,524,965 | A |   | 6/1996 | Barley |
| 5,549,353 | A |   | 8/1996 | Gaudet et al. |
| 5,636,884 | A |   | 6/1997 | Ladetto et al. |
| 5,639,141 | A |   | 6/1997 | Hanemaayer |
| 5,690,384 | A |   | 11/1997 | Rossi |
| 5,711,505 | A |   | 1/1998 | Nemoto |
| 5,722,724 | A |   | 3/1998 | Takei et al. |

(Continued)

FOREIGN PATENT DOCUMENTS

DE 4132279 A1 * 4/1993 ............. 297/94

*Primary Examiner*—Rodney B. White
(74) *Attorney, Agent, or Firm*—Merchant & Gould P.C.

(57) ABSTRACT

A reversible seat system for a vehicle is provided. A seatback includes at least one post-like element extending below a lower side of the seatback. At least one receiving slot is located on each of the anterior and posterior sides of the seat cushion. The receiving slots are configured to receive the post-like element. The seatback is removable and replaceable between a first position and a second position, where the first position is forward-facing and the second position is rearward-facing.

15 Claims, 7 Drawing Sheets

U.S. PATENT DOCUMENTS

| | | |
|---|---|---|
| 5,741,000 A | 4/1998 | Goodbred |
| 5,765,803 A | 6/1998 | Graham |
| 5,797,575 A | 8/1998 | Clausen |
| 5,820,215 A | 10/1998 | Dreisbach |
| 5,833,203 A | 11/1998 | Denis et al. |
| 5,911,465 A | 6/1999 | Yamamoto et al. |
| 5,921,606 A | 7/1999 | Moradell et al. |
| 5,954,398 A | 9/1999 | Namba et al. |
| 6,053,569 A * | 4/2000 | Flyborg .................... 297/94 X |
| 6,079,763 A | 6/2000 | Clemente |
| 6,105,183 A * | 8/2000 | Bly ......................... 297/94 X |
| 6,155,626 A | 12/2000 | Chabanne et al. |
| 6,161,892 A | 12/2000 | Chabanne et al. ... 296/65.01 X |
| 6,168,234 B1 | 1/2001 | Haynes et al. |
| 6,199,945 B1 | 3/2001 | Kim ............................ 297/94 |
| 6,457,694 B1 | 10/2002 | Haynes et al. |
| 6,488,333 B2 | 12/2002 | Kim ............................ 297/94 |
| 6,494,531 B1 | 12/2002 | Kim ............................ 297/94 |
| 2003/0047974 A1 | 3/2003 | Tame |

* cited by examiner

REVERSIBLE SEATBACK FOR A VEHICLE

FIELD OF THE INVENTION

The invention generally relates to reversible vehicle seats. More specifically, the invention relates to a vehicle seat including a removable seatback which can be made to face the rear of a vehicle.

BACKGROUND OF THE INVENTION

Modem multi-purpose vehicles such as sport utility vehicles (SUVs) and minivans have become extremely versatile and family-friendly, which explains much of their broad appeal among consumers. Such versatility would be greatly increased if, when the vehicle is at rest, the front seats of such vehicles could easily be reversed so that the occupant faces the rear of the vehicle. With the front seat occupant(s) facing the occupants in the second row of seating, conversations could be easier facilitated, in-car dining would be more enjoyable, and passing time inside the vehicle in the event, for example, of inclement outdoor weather would be more enjoyable. Such seat reversibility would need to be accomplished with minimal effort, maximum safety for all age groups, remain aesthetically pleasing to today's demanding consumer, and at minimal cost to the automotive industry. Previous attempts to accomplish each of these objectives have failed.

Reversible automobile seats have been the subject of previous disclosures. These efforts, however, have not accomplished all of the objectives described above. Several of these disclosures are discussed briefly below. For example, U.S. Pat. No. 870,385 to Rideout et al. describes a reversible car seat that has mutually interchangeable back and seat components. U.S. Pat. No. 1,051,040 to Wheatley discloses a reversible car seat in which the seatback flips on a horizontal axis to create a rear-facing orientation. U.S. Pat. No. 2,004,850 to Bugatti utilizes a reversible seat for use in road or rail vehicles, with the seatback and cushion mounted on a common framework.

U.S. Pat. No. 3,964,785 to Plume describes a complex seat in which the seat bottom rakes in either direction to create the reversed orientation, an approach that involves moving parts that would make the whole seat assembly too expensive for mass production. U.S. Pat. No. 4,436,270 to Muraishi and U.S. Pat. No. 6,168,234 B1 to Haynes et al. describe automobile seats that accomplish the reversed orientation through pivots or rotation. U.S. Pat. No. 4,072,343 to Meza and U.S. Pat. No. 4,081,051 to Logsdon also describe pivoting seats for dual-purpose vehicles in the construction industry. However, this pivoting or rotating action is difficult to accomplish in modem automobile interiors because modem interiors lack adequate room for such rotation of the seat.

U.S. Pat. No. 5,690,384 to Rossi describes a seat with a removable seat portion. The two sides of the removable portion are each made of a different material, allowing the user to choose which material faces direct sunlight while the vehicle is parked. U.S. Pat. No. 5,954,398 to Namba et al. involves a seatback that reclines to a flat position and when combined with a foldable second row seat, creates a continuous plane inside the vehicle. U.S. Pat. No. 6,079,763 to Clemente discloses a second row seat in which the seatback folds forward against the seat cushion; the whole structure then folds forward again for out-of-the-way storage. U.S. Pat. Nos. 6,155,626 and 6,161,892, and EP 0,976,605 A1, all to Chabanne et al., describe a removable, reversible and longitudinally adjustable vehicle seat that rests on slides or runners on the vehicle floor. The seat can also fold up and forward for compact storage in a manner similar to the Clemente patent.

U.S. Pat. Nos. 6,199,945 B1, 6,488,333 B2 and 6,494,531 B1, all to Kim, disclose a vehicle seat for reversible occupant travel. The seat features a double-sided seatback that is longitudinally adjustable using controls on its slides or runners on the floor. The seat involves many exposed metal parts with sharp corners and is likely too complex for mass production.

Each of the above-identified disclosures are inadequate for at least one of the following reasons: (1) too complex for mass production, so that the cost of manufacture is too high, (2) too many moving metal components that could inadvertently cause injury to small children, (3) a rotating or pivoting component for which modem automobile interiors do not allow sufficient space, and (4) an overall design/appearance that would likely not be acceptable to consumers that demand interior beauty as well as functionality and ease of use.

In contrast, the structure described by this invention is conceptually simple, and involves no exposed, moveable metal parts. Therefore, it does not have any sharp corners, which could cause injury or other damage. It also does not involve rotation, pivoting action, or swiveling action to accomplish a reversed seat orientation. Therefore, the interior space of the vehicle is not a limiting factor for the use of the present invention. Moreover, the present invention accomplishes the above objectives without compromising the safety or appearance of an aesthetically pleasing automobile interior environment.

Accordingly, the present invention addresses such prior art shortcomings of automobile seats, and in particular the shortcomings of known reversible automobile seats.

SUMMARY OF THE INVENTION

In one aspect of the invention, a reversible seat system for a vehicle is provided. A seat cushion has an anterior side and a posterior side. A seatback includes at least one post-like element extending below a lower side of the seatback. At least one receiving slot is located on each of the anterior and posterior sides of the seat cushion. The receiving slots are configured to receive the post-like element. The seatback is removable and replaceable between a first position and a second position. In the first position, the post-like element of the seatback is inserted into the receiving slot on the posterior side of the seat cushion, and in the second position, the post-like element of the seatback is inserted into the receiving slot on the anterior side of the seat. The seatback is capable of being rotated 180 degrees between the first position and the second position.

In another aspect of the invention, a method of manufacturing a reversible seat for a vehicle is provided. The method includes forming a seatback that includes at least one post-like element extending below a lower side of the seatback. The method also includes forming a seat cushion with at least one receiving slot located on each of the anterior and posterior sides of the seat cushion. The receiving slots are configured to receive the post-like element. The seatback is formed to be removable and replaceable between a first position and a second position. In the first position, the post-like element of the seatback is inserted into the receiving slot on the posterior side of the seat cushion and, in the second position, the post-like element of the seatback is inserted into the receiving slot on the anterior side of the seat. The seatback is capable of being rotated 180 degrees between the first position and the second position.

These and other features of the invention will become apparent upon a more detailed description of preferred embodiments of the invention as described below.

BRIEF DESCRIPTION OF THE DRAWINGS

Referring to the Drawings, where like numerals represent like parts throughout the several views.

DETAILED DESCRIPTION OF THE PREFERRED EMBODIMENTS

Figure 1A:
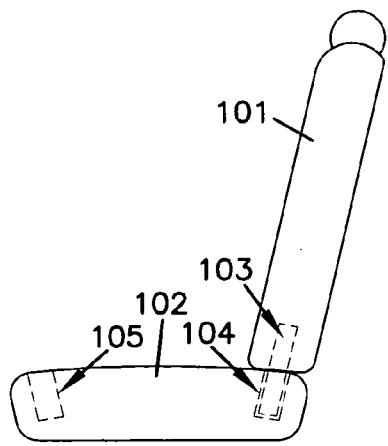
FIGS. 1A–1C show side elevational views of a first embodiment of a seat configuration of the present invention, conceptually illustrating the removal of a seatback from a rear edge of the seat cushion, rotation of that seatback 180 degrees about a vertical axis, and reconnection of the seatback to a front of the seat cushion to create a rear-facing seat.
Figure 1B:
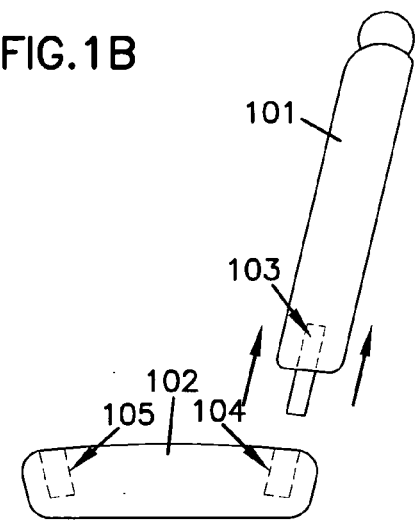
Figure 1C:
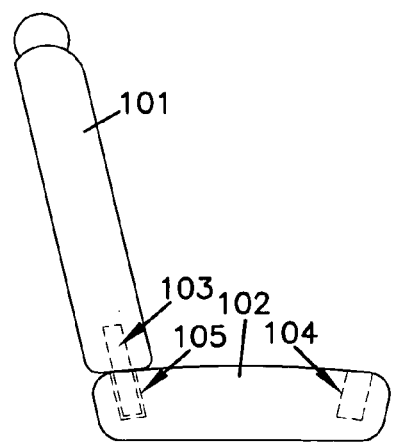

Referring now to the drawings, and in particular FIGS. 1A–1C, a reversible front automobile seat is diagrammatically illustrated in accordance with one embodiment of the present invention. The vehicle seat generally includes a seatback 101, seat cushion 102, a pair of metal post members 103, posteriorly placed receiving slots 104 and anteriorly placed receiving slots 105. The pair of metal post members 103 and the pairs of receiving slots 104 and 105 collectively comprise a detachable connection system for selectively attaching the seatback 101 adjacent to the posterior or anterior end of the seat cushion 102. Although metal is a preferred material, the post 103 and receiving slots of this embodiment and each of the following embodiments could be manufactured of any other sturdy material, such as wood, plastic, or the like.

The seatback 101, ordinary in all other aspects, contains two metal posts 103 each protruding out of the bottom edge of seatback 101. Approximately one half of each post 103 is securely embedded in seatback 101 and the other one half protrudes downward from the bottom edge of seatback 101. While the preferred embodiments of the invention that will be disclosed herein illustrate a seatback connection system that utilizes a pair of interconnecting post/receptor members, it will be understood that one or a plurality of such connectors could be used. In addition, it is not necessary that half of the post be secured into the receptor member. More or less of the post could be received by the receptor member, as long as the post is adequately secured in or to the receptor member.

FIGS. 1A–1C illustrate the reversibility of the seatback 101. In the normal forward-facing seat orientation (FIG. 1A), the bottom edge of seatback 101 rests firmly against the rear edge of seat cushion 102, with the upper one half of metal posts 103 securely embedded within seatback 101 and the lower one half of metal posts 103 securely inserted and locked in place inside the receiving slots 104. In the forward-facing seat orientation, the receiving slots 105 are empty and concealed with the use of tight-fitting covers 106 (shown in FIG. 2). The covers 106 are preferably fashioned with the same color and upholstery material as the rest of the vehicle seat. While it is preferable that the cover matches the vehicle seat, other materials or colors may be used.

FIGS. 1B and 1C illustrate the process of removing and reconnecting the seatback 101. FIG 1B shows the seatback 101 in the normal forward-facing orientation after having been removed from the receiving slots 104. The seatback 101 is easily disconnected from seat cushion 102 by pulling seatback 101 upward. The seatback 101 can then be easily rotated 180 degrees about a vertical axis, so that it is facing the rear of the vehicle. As shown in FIG. 1C, after the seatback 101 is rotated it can be reconnected to seat cushion 102 so that seatback 101 faces the rear of the vehicle. This reversal is accomplished by inserting metal posts 103 into the anteriorly placed receiving slots 105. This achieves a rear-facing front automobile seat as illustrated in FIG. 1C. If the back surface of seatback 101 is adequately padded, it would not be necessary to rotate the seatback 101 180 degrees, and the metal posts 103 could be engaged into receiving slots 105 without rotation.

Figure 2A:
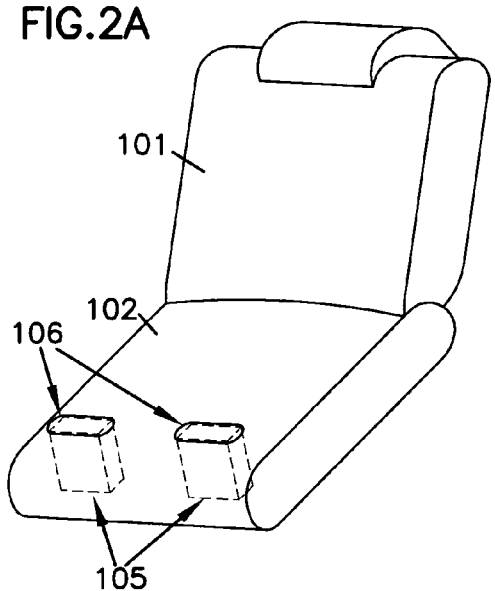
FIGS. 2A and 2B are perspective views of the seat configurations illustrated in FIGS. 1A and 1C.
Figure 2B:
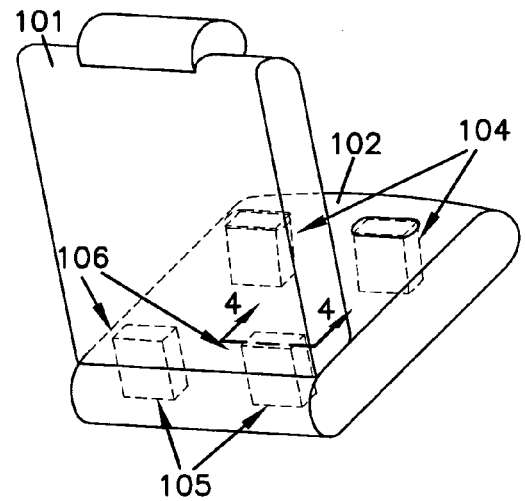

FIGS. 2A and 2B show perspective views of the reversible seat illustrated in FIGS. 1A–1C, showing only the seatback secured to the seat cushion in a front-facing orientation and in a rear-facing orientation. FIGS. 2A and 2B also illustrate covers 106, which conceal receiving slots 105 when the seatback 101 is in a front-facing orientation. Covers 106 can also be used to cover receiving slots 104 when the seatback 101 is in a rear-facing orientation. In a preferred embodiment, metal posts 103 and the receiving slots 104, 105 are rectangular-shaped. It will be understood, however, that other shapes and configurations could be used. The metal posts 103 are preferably about six inches in length, four inches wide and one inch thick. Each of the four receiving slots 104, 105, per seat is preferably about three inches deep and four inches by one inch in rectangular dimension. It will be understood, however, that other dimensions could be used to accomplish the present invention.

Figure 3:
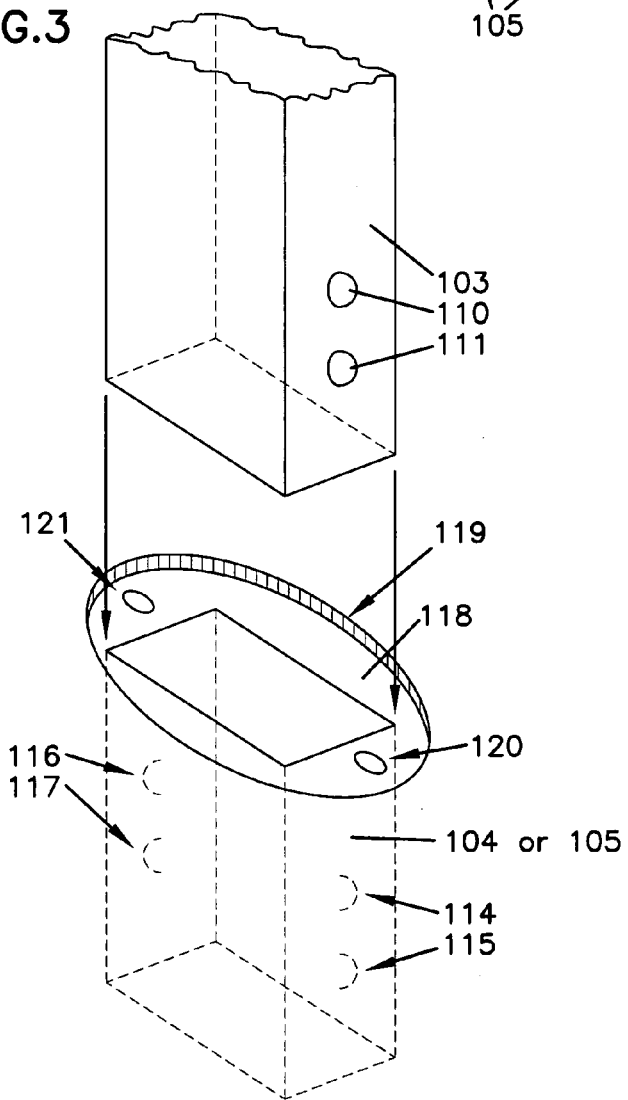
FIG. 3 illustrates an enlarged perspective view of one of the connection systems for the seatback shown in FIGS. 1A–1C.

A more detailed illustration of one of the male metal posts 103, properly aligned with one of the female receiving slot members 104 and 105 just before insertion, is shown in FIG. 3. Metal post 103 contains four internal spring-loaded metal balls generally indicated at 110, 111, 112, 113, two on either side of the post 103, which protrude almost halfway out the side of post 103. When metal post 103 is fully inserted into receiving slot 104 (or 105), spring-loaded balls 110, 111, 112, 113 are properly aligned with hemispherically-shaped divets 114, 115, 116, 117 formed in the receiving slots, such that the balls 110, 111, 112, 113 are forced into the hemispherically-shaped divets 114, 115, 116, 117 to securely hold the seatback 101 in place regardless of which seat orientation is chosen. An arcuate face plate 118, secured by screws 120, 121, surrounds the opening of the receiving slot 104 (or 105) and is recessed below the surface of the seat cushion 102 as indicated by lip 119 and provides a retentive seat or base for the installation of concealing covers 106.

Figure 4:
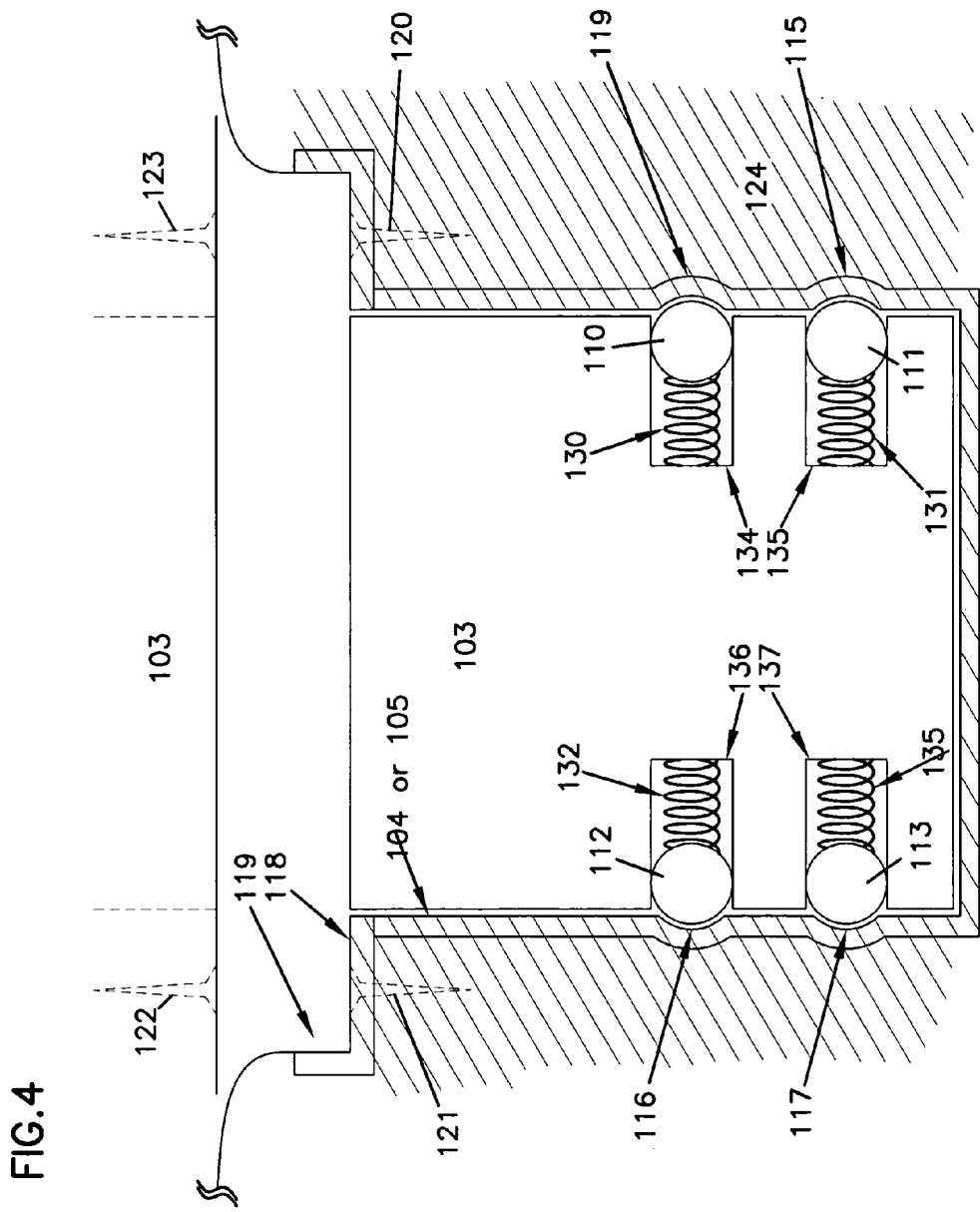
FIG. 4 is a partial cross-sectional side view of the connection system shown in FIG. 2B, taken along line 4—4 of FIG. 2B, with the seatback in a connected position.

FIG. 4 illustrates an enlarged partial cross-section view of the mechanical seatback connection system shown in FIG. 3. Metal post 103 locks into receiving slots 104 and 105 as illustrated in FIG. 4. Receiving slots 104 and 105 are preferably formed as a sleeve which is attached to the seat cushion. Although the method of attachment of the sleeve is not illustrated in FIG. 4, it will be understood by one of ordinary skill in the art that any suitable means of attachment could be used, such as screwing, bolting, glueing, etc. Alternatively, the sleeve or receiving slots could be formed directly into the seat cushion.

When metal post 103 is fully inserted into receiving slots 104 and 105, balls 110, 111, 112, 113, biased by stiff springs 130, 131, 132, 133 which are each contained within holes 134, 135, 136, 137 formed in the post 103, push laterally into and cooperatively engage hemispherically-shaped divets 114, 115, 116, 117 which are machined or otherwise formed into the sidewalls of receiving slots 104 and 105. This action holds the post 103 securely inside receiving slots 104 and 105. The faceplate 118 (with recessed lip 119) and receiving slots 104 and 105 may be formed of one contiguous piece of metal, secured into the core 124 of the seat cushion 102 by screws 120, 121. Screws 122, 123 secure the remainder of post 103 inside seatback 101. It will be understood that the faceplate 118 could be formed integrally with the sleeve or receiving slots 104 and 105, if so desired, as shown in FIG. 5.

Figure 5:
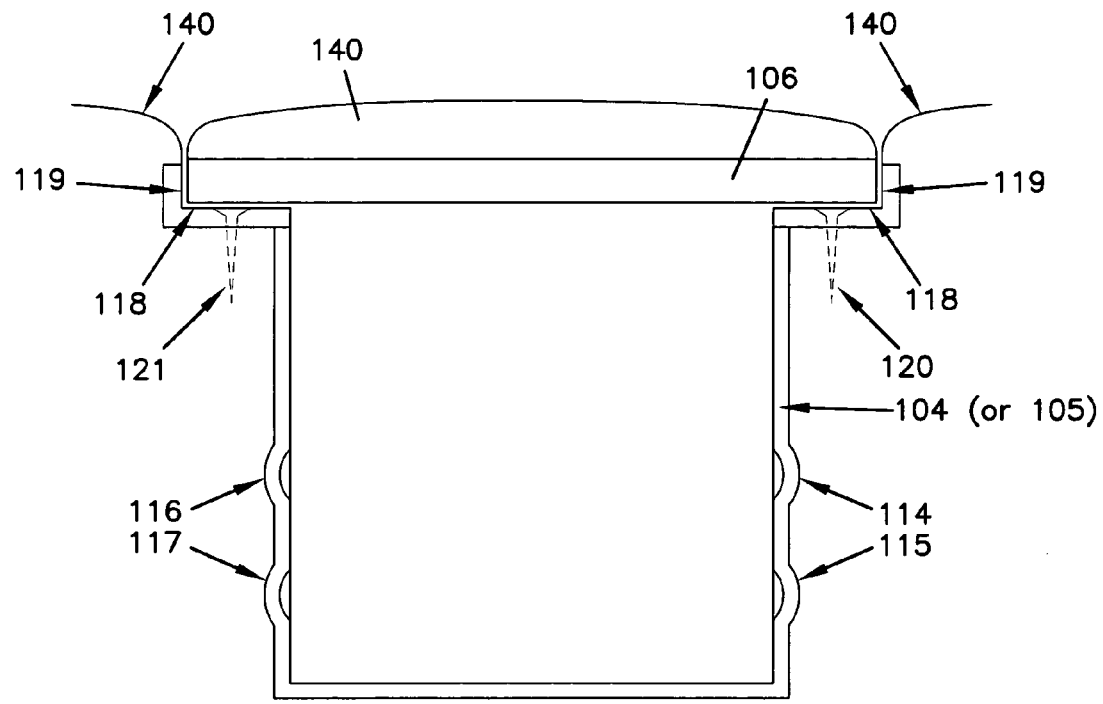
FIG. 5 is a side view of the receptor portion of the connection system of FIG. 3, illustrated with the seatback in a removed position and with a cover in place over the receptor portion.
Figure 6:
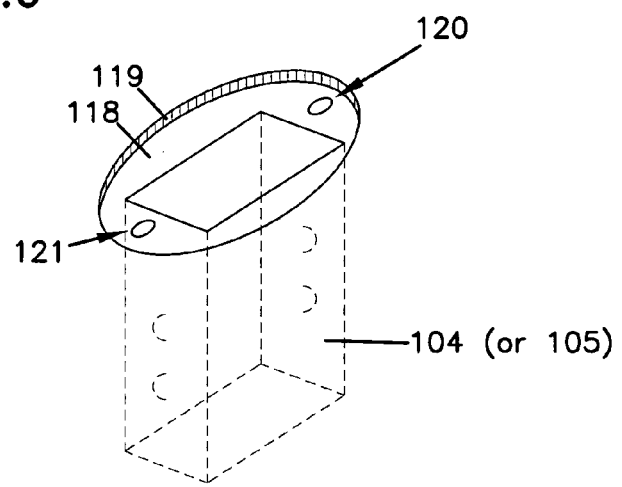
FIG. 6 is a perspective view of the entry port for the receptor portion of the connection system shown in FIG. 5, illustrated with the cover removed.

FIG. 5 is a side view of receiving slot 104 (or 105) shown with metal post 103 removed thereform and the concealing cover 106 operationally fixed in place. Cover 106 is preferably fashioned with a piece of upholstery 140 of the same color and material as the rest of the automobile seat. Cover 106 conceals the faceplate 118 and receiving slots 104 to improve aesthetics and to protect the receiving slots 104 from damage and from collecting debris when receiving slot 104 is not in use. FIG. 6 is another illustration of the receiving slot 104 (or 105) when such cover 106 is removed, without the lines shown in FIG. 3. The hemispherically-shaped divets are not shown for the sake of clarity.

It should be understood that the receiving slots 104, 105 shown above are preferably structurally identical. In that way, posts 103 can be inserted into either slots 104 or 105 without any difficulty. If desired, however, the two seatback posts could be constructed of different dimensions, as long as the matching receiving slots are cooperatively and matingly configured to receive these different dimensions. Alternatively, different numbers of posts or different shapes of posts can be utilized within the spirit of this invention. For example, one or three posts could be used. The posts also need not be rectangular in shape. Many other post shapes can be used without difficulty. For example, the post could be cylindrical rather than rectangular. Further, the relative positions of the biased balls 110, 113 and their cooperative divets 114–117 could be reversed from those configurations shown in the figures. Alternatively, more or less biased balls and divets could be used. Further, types of post locking mechanisms other than the biased balls and divets could be used.

It may be desirable to have an electronic failsafe mechanism that prevents the vehicle from moving in either forward or reverse, while the seatback is not in the frontward-facing position. Otherwise, the vehicle may accidentally be placed in a forward moving gear and the occupant of the vehicle may encounter difficulties in stopping the vehicle while in the rearward-facing direction. This mechanism could simply be a sensor that is connected to the receiving slots to determine if the seatback is properly locked in the frontward-facing position. If not, the sensor would prevent the vehicle from achieving motion in forward or reverse, by, for example, locking those gears down.

Figure 7:
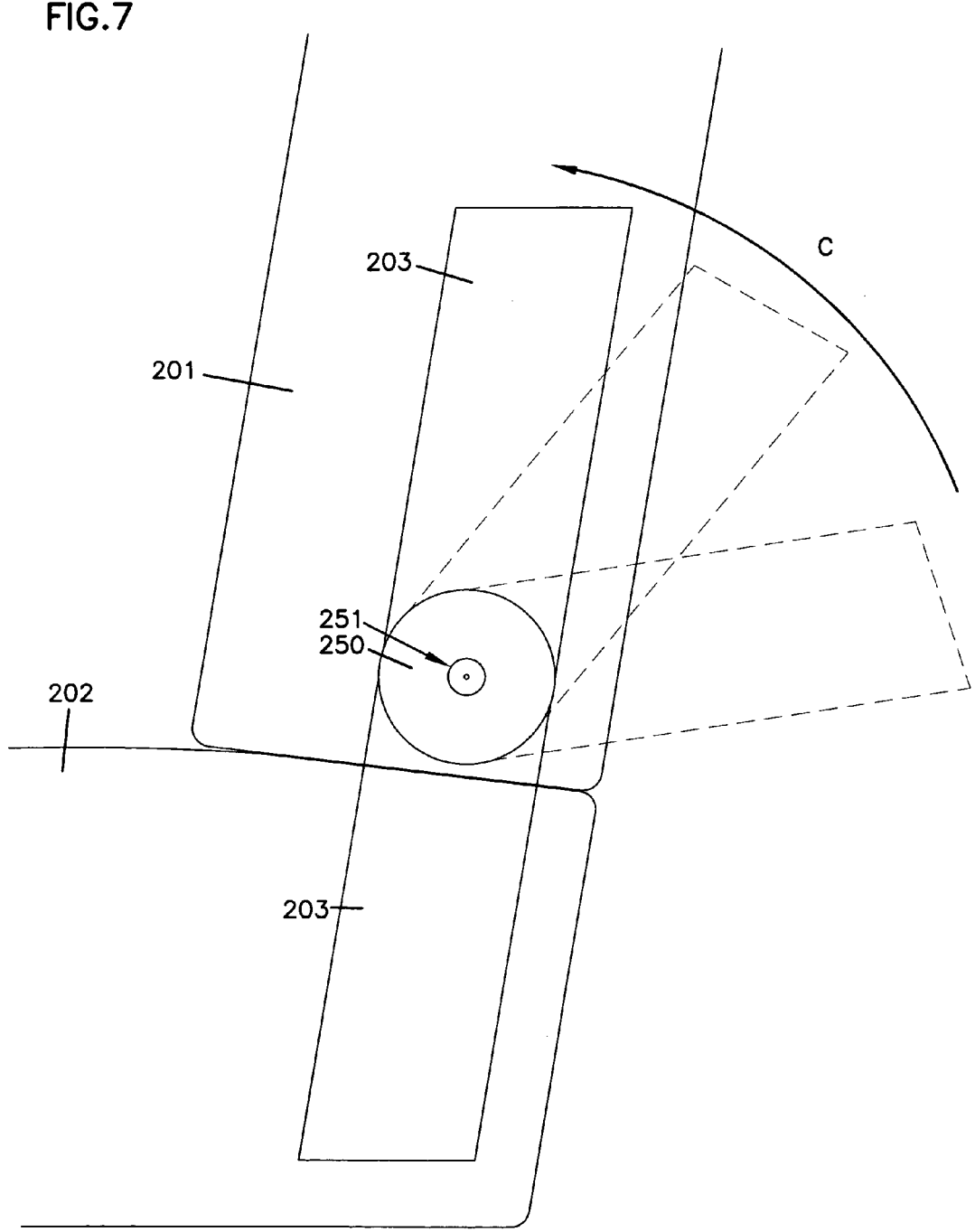
FIG. 7 is a diagrammatic side view of an embodiment of the present invention, illustrating a rotation of a seatback about a pivot point to provide for a reclining action.

FIG. 7 illustrates another embodiment of the present invention. FIG. 7 depicts an arrangement that allows for seat reclination, if it is desired and/or needed. The details of the receiving slots are not shown; however, it is to be understood that the same description provided above with regard to the previous figures applies to this embodiment as well. FIG. 7 shows, in side elevation, a seatback 201, a seat cushion 202, and an embedded metal post 203 that contains a multi-positionable turret 250 located slightly above the midpoint of post 203. The turret 250 allows for the upper half of post 203 to rotate about a horizontal axis 251 so that the invention allows the seatback to be reclined through a range of positions as indicated by arrow C. Modem automobile front seats have the ability for such reclination.

Figure 8:
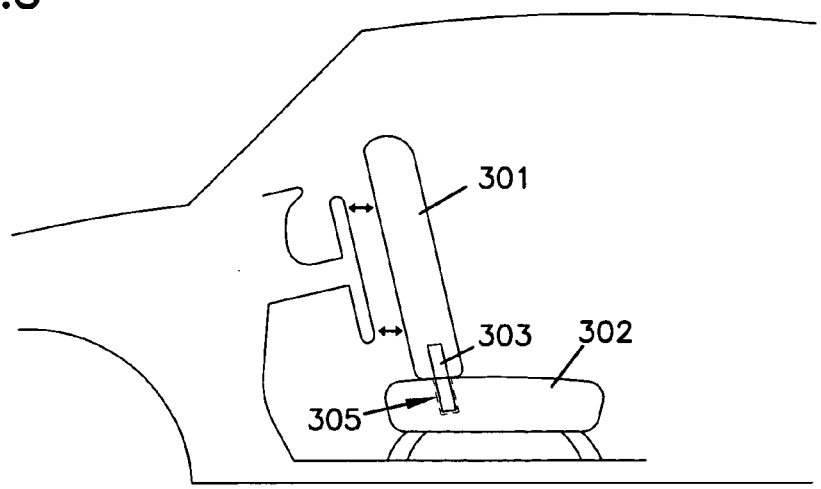
FIG. 8 is a diagrammatic side view of an embodiment of the present invention, illustrating the driver's side reversible seat having receiving slots that are located toward the middle of the seat cushion, to make allowances for the location of the steering wheel.

Shown as a side elevation in FIG. 8 is an important variation of the invention in the case of the driver's front automobile seat. In modem automobiles, the steering wheel tends to protrude significantly out from the dashboard toward the driver. In order for the invention to accommodate the presence of the steering wheel and still be adequately reversible, the receiving slots 305 are located more toward the center of the seat cushion 302 rather than adjacent the front edge of the seat cushion so that seatback 301 does not adversely affect the steering wheel. With this arrangement, when seat posts 303 are inserted into the receiving slots 305, the seatback clears the steering wheel without require the lower seat cushion to be longitudinally moved relative to the floor.

Figure 9A:
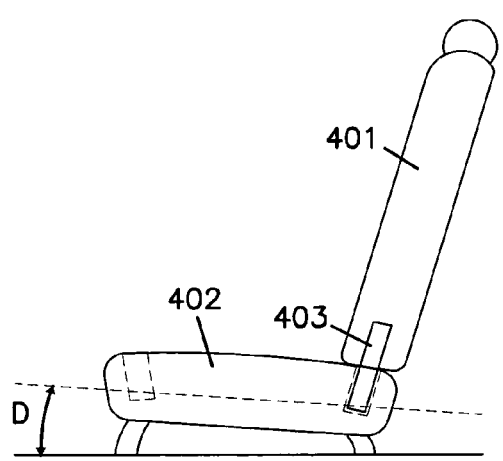
FIGS. 9A–9C are diagrammatic side views of an embodiment of the present invention where the seat cushion is able to tilt for additional comfort when the seat is in the reversed orientation.
Figure 9B:
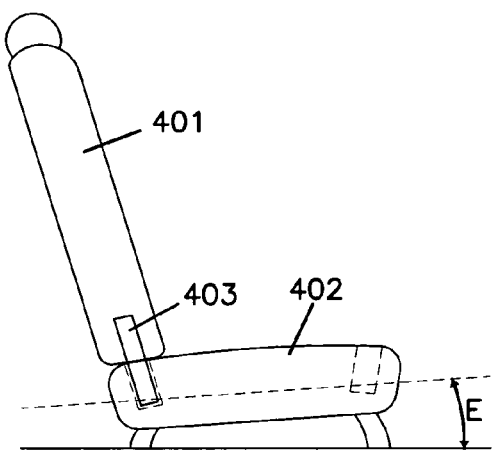
Figure 9C:
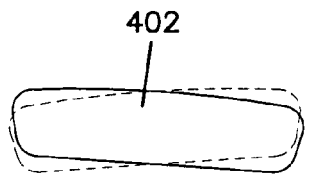

Yet another embodiment of the invention is shown in FIGS. 9A–9C. This embodiment addresses the slight posterior decline of modem automobile seat cushions for occupant comfort. FIGS. 9A–9C illustrate a seatback 401, a seat cushion 402, and a metal post 403, similar in function to those parts described in previous embodiments. In modem automobiles, the seat cushion 402 is positioned at a slight angle D so that the front edge is higher than the back edge. This angle D is intended to provide added occupant comfort while sitting in the vehicle. However, if the rear-facing orientation of the seatback of this invention is used without regard for this slight angle, the rear-facing seating position may have an uncomfortable forward tilt to its occupant. In order to provide a more comfortable seating position for the occupant while the seat is facing rearward, the invention is further provides an embodiment where the front edge of the seat cushion 402 can be lowered toward the vehicle floor while simultaneously raising the rear edge of seat cushion 402 away from the floor. In other words, the seat cushion 402 is capable of pivoting so that the seat can be adjusted for comfort depending on whether the occupant is facing forward or rearward. Accordingly, the slight posterior decline of the seat cushion 402 while the seat is in the rear-facing orientation, as shown by angle E, can be accomplished to make the seat position more comfortable. Although the mechanisms for accomplishing this adjustment of the seat are not described in detail, it will be understood that one of ordinary skill in the art could accomplish this seat cushion adjust in numerous ways, such as, for example, securing the seat cushion about a pivot point (or points) and allowing it to rotate about that pivot point (or points). Alternately, the connection for the seat cushion could simply include adjustment points so that the front of the seat cushion and the rear of the seat cushion can be adjusted independently of each other.

Figure 10:
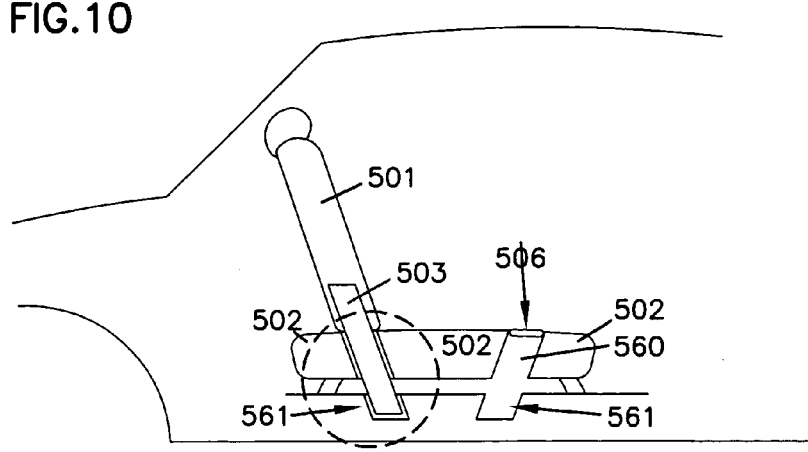
FIG. 10 is a side view of an embodiment of the present invention with the seatback in the reversed orientation, where the seat is configured so that the connection system post extends completely through the seat cushion and is anchored into a receiving pocket on the floor of the vehicle.

Shown as a diagrammatic side elevation in FIG. 10 is a variation of the invention which would hold the post 503 more securely no matter which orientation of the seat is chosen, creating a more durable seatback is illustrated. The durability of the seatback is such that the seatback can more easily withstand the pressure of supporting the occupant without giving way or fatiguing over a long period of time. Post 503 is at least 5 inches longer than in previous figures, extends completely through seat cushion 502 via channels 560, and anchors into receiving slots (pockets) 561 on the floor of the vehicle. The channels 560 act as the sleeve for allowing the posts 503 to be received through the seat cushion and into the receiving slots 561 secured to the floor of the vehicle. Thus, the posts 503 are securely fitted into the receiving slots by the extended length of connection of the posts 503 into the receiving pockets 561. It will be understood that this connection system could be used alone or in conjunction with other connection systems described here, such as, for example, the spring-loaded ball bearings (shown in FIG. 4) and matching hemispherical divets (shown in FIG. 4) system. Also shown is tight-fitting cover 506 concealing the opening to channel 560 when such channel is not being used.

Figure 11A:
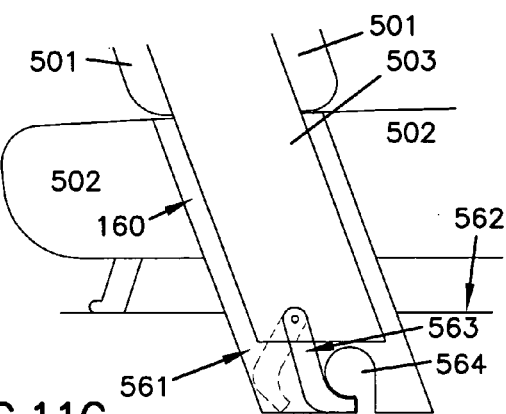
FIGS. 11A–11D are diagrammatic side views of embodiments of the present invention, illustrating various mechanisms for securing the anchored post system of FIG. 10.
Figure 11B:
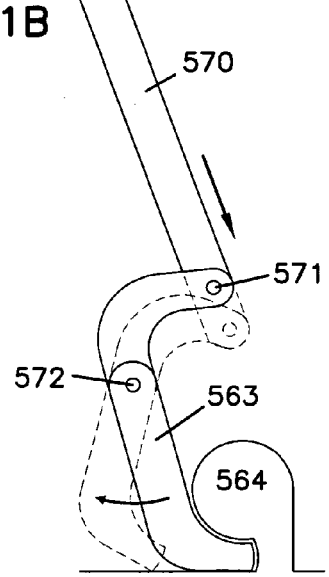

Shown in FIGS. 11A–11D as diagrammatic side elevations are three different possible methods for anchoring post 503 into receiving pocket 561. Pocket 561 is recessed below the plane of the vehicle floor 562. In FIG. 11A, the anchoring mechanism includes a pivotal lock member 563, which protrudes downward from the end of post 503, and lockingly mates tightly underneath receptor ball 564. The outer surface of the pivotal lock member 563 is preferably curved to form a cam surface for directing the lock member into engagement with the ball 564 as the post is lowered into its locked position. FIG. 11B illustrates a release mechanism for disengaging lock member 563 from ball 564 to facilitate removal of the post 503 (not shown for clarity) from receiving slot (pocket) 561. A rod 570 internally extends the length of seatback 501 and is connected via joint 571 to the upper portion of a C-shaped appendage 563. As a downward force is applied to rod 570, locking member 563 is pushed out from beneath ball 564 through the presence of a fulcrum point 572. Thus, the removal of post 503 can be easily accomplished.

Figure 11C:
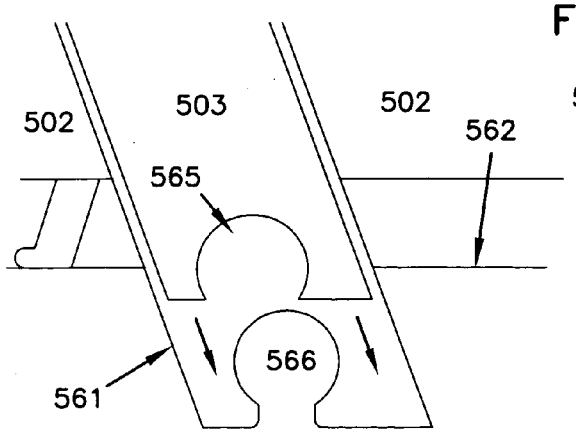

FIG. 11C illustrates yet another mechanism for retaining the post 503. The end of post 503 has a recessed hemispherical hole 565. When a downward force is applied to post 503, hole 565 fits tightly over ball 566 located on the bottom of pocket 561. Hole 565 is lined with a material which is flexible enough to allow fitting over ball 566, yet firm enough to hold post 503 securely in place. A moderate to strong upward force applied to post 503 would cause hole 565 to lose its grip on ball 566, releasing post 503. The same principle could be applied using any two cooperatively mating snap-fit surfaces.

Figure 11D:
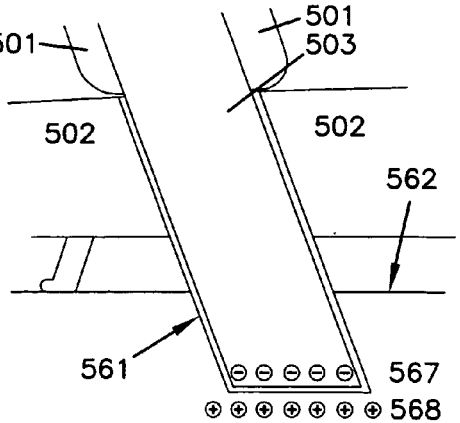

FIG. 11D illustrates another mechanism for retaining post 503. Post 503 is held in place through attractive magnetic forces, schematically represented as negative forces 567 and positive forces 568. A moderate to strong upward force applied to post 503 would break the magnetic attraction, releasing post 503.

In addition, it should be noted that a number of other retention mechanisms are possible. For example, a hook and loop system, such as Velcro®, could be used.

The above specification and described embodiments provide specific descriptions of structures which possess the inventive features of this invention. Other embodiments of the invention can be made without departing from the spirit and scope of the invention which will reside in the claims hereinafter appended.

What is claimed is:

1. A reversible-seat system for a vehicle, the system comprising:
   a seat cushion having an anterior side and a posterior side;
   a seatback, the seatback including at least one post element extending below a lower side of the seatback; and
   at least one receiving slot located on each of the anterior and posterior sides of the seat cushion, the receiving slots being configured to cooperatively, retainably receive the post element,
   wherein the seatback is removable from the receiving slots and replaceable between a first position and a second position, the first position being where the post element of the seatback is inserted into the receiving slot on the posterior side of the seat cushion and the second position being where the post element of the seatback is inserted into the receiving slot on the anterior side of the seat,
   wherein the at least one receiving slot is formed in the seat cushion, and
   the at least one receiving slot is located within an outside edge of the seat cushion and extends through a top surface of the seat cushion.

2. The reversible seat system of claim 1, wherein the anterior side receiving slot is formed closer to a middle portion of the seat cushions than to the anterior side of the seat cushion.

3. The reversible seat system of claim 1, further including a cover that covers a receiving slot that is not in receipt of the post element.

4. The reversible seat system of claim 1, wherein the receiving slots extends through the seat cushion and adapted to be anchored to an area of the vehicle floor located beneath the seat cushion.

5. A reversible seat system for a vehicle, the system comprising:
   a seat cushion having an anterior side and a posterior side;
   a seatback, the seatback including at least one post element extending below a lower side of the seatback;
   at least one receiving slot located on each of the anterior and posterior sides of the seat cushion, the receiving slots being configured to cooperatively, retainably receive the post element; and
   a retention mechanism in the receiving slot configured to releaseably retain the post element in the receiving slot;
   wherein the seatback is removable from the receiving slots and replaceable between a first position and a second position, the first position being where the post element of the seatback is inserted into the receiving slot on the posterior side of the seat cushion and the second position being where the post element of the seatback is inserted into the receiving slot on the anterior side of the seat; and the retention mechanism comprises spring-loaded balls pressing laterally into mating hemispherical divets on side walls of the receiving slot.

6. A reversible seat system for a vehicle, the system comprising:
 a seat cushion having an anterior side and a posterior side;
 a seatback, the seatback including at least one post element extending below a lower side of the seatback;
 at least one receiving slot located on each of the anterior and posterior sides of the seat cushion, the receiving slots being configured to cooperatively, retainably receive the post element; and
 a retention mechanism in the receiving slot configured to releaseably retain the post element in the receiving slot;
 wherein the seatback is removable from the receiving slots and replaceable between a first position and a second position, the first position being where the post element of the seatback is inserted into the receiving slot on the posterior side of the seat cushion and the second position being where the post element of the seatback is inserted into the receiving slot on the anterior side of the seat; and
 wherein the retention mechanism comprises one or more of attractive magnets, hook and loop-type fasteners, or a ratcheting track.

7. A reversible seat system for a vehicle, the system comprising:
 a seat cushion having an anterior side and a posterior side;
 a seatback, the seatback including at least one post element extending below a lower side of the seatback; and
 at least one receiving slot located on each of the anterior and posterior sides of the seat cushion, the receiving slots being configured to cooperatively retainably receive the post element;
 wherein the seatback is removable from the receiving slots and replaceable between a first position and a second position, the first position being where the post element of the seatback is inserted into the receiving slot on the posterior side of the seat cushion and the second position being where the post element of the seatback is inserted into the receiving slot on the anterior side of the seat; and
 post element has a rotation mechanism that is configured to permit the seatback to recline with respect to the seat cushion.

8. The reversible seat system of claim 7, wherein the rotation mechanism comprises a multi-positionable turret.

9. The reversible seat system of claim 1, wherein the seat cushion is configured so that it may rotate between at least two positions, the first position tilting upward toward the front of the vehicle, the second position tilting downward toward the front of the vehicle.

10. A reversible seat system for a vehicle, the system comprising:
 a seat cushion having an anterior side and a posterior side;
 a seatback, the seatback including at least one post element extending below a lower side of the seatback;
 at least one receiving slot located on each of the anterior and posterior sides of the seat cushion, the receiving slots being configured to cooperatively, retainably receive the post element; and
 an electronic failsafe mechanism that prevents the vehicle from moving in either forward or reverse, while the seatback is not in the first position;
 wherein the seatback is removable from the receiving slots and replaceable between a first position and a second position, the first position being where the post element of the seatback is inserted into the receiving slot on the posterior side of the seat cushion and the second position being where the post element of the seatback is inserted into the receiving slot on the anterior side of the seat.

11. The reversible seat system of claim 1, further comprising two post elements extending below the lower side of the seatback.

12. A method of manufacturing a reversible seat for a vehicle, the method comprising:
 forming a seatback that includes at least one post element extending below a lower side of the seatback; and
 forming a seat cushion with at least one receiving slot located on each of the anterior and posterior sides of the seat cushion, the receiving slots being configured to receive the post element;
 wherein the seatback is formed to be removable and replaceable between a first position and a second position, the first position being where the post element of the seatback is inserted into the receiving slot on the posterior side of the seat cushion and the second position being where the post element of the seatback is inserted into the receiving slot on the anterior side of the seat; and
 the at least one receiving slot is formed within an outside edge of the seat cushion so that it extends through a top surface of the seat cushion.

13. The method of claim 12, wherein the seatback is capable of being rotated 180 degrees between the first position and the second position.

14. The method of claim 12, wherein the seatback is formed with two post elements.

15. A method of manufacturing a reversible seat for a vehicle, the method comprising:
 forming a seatback that includes at least one post element extending below a lower side of the seatback, and
 forming a seat cushion with at least one receiving slot located on each of the anterior and posterior sides of the seat cushion, the receiving slots being configured to receive the post element,
 wherein the seatback is formed to be removable and replaceable between a first position and a second position, the first position being where the post element of the seatback is inserted into the receiving slot on the posterior side of the seat cushion and the second position being where the post element of the seatback is inserted into the receiving slot on the anterior side of the seat, and
 the post element is formed with a rotation mechanism that is configured to permit the seatback to recline with respect to the seat cushion.

* * * * *

UNITED STATES PATENT AND TRADEMARK OFFICE
CERTIFICATE OF CORRECTION

PATENT NO.        : 6,991,285 B1
APPLICATION NO. : 10/802556
DATED             : January 31, 2006
INVENTOR(S)       : Hemenway It is certified that error appears in the above-identified patent and that said Letters Patent is hereby corrected as shown below:

Col. 1, line 12:  "Modem multi-purpose" should read --Modern multi-purpose--

Col. 6, line 34:  "Modem automobile" should read --Modern automobile--

Col. 6, line 55:  "In modem" should read --In modern--

Col. 9, line 29, claim 6:  "wherein the retention mechanism" should read --the retention mechanism--

Signed and Sealed this

Twenty-ninth Day of August, 2006

JON W. DUDAS
*Director of the United States Patent and Trademark Office*